United States Patent [19]
Sieverin et al.

[11] 3,982,619
[45] Sept. 28, 1976

[54] FLOW CONTROL APPARATUS AND METHOD

[75] Inventors: Walter Joseph Sieverin, Buffalo Grove; Donald Henry Ruge, Crystal Lake, both of Ill.

[73] Assignee: American Can Company, Greenwich, Conn.

[22] Filed: Oct. 1, 1975

[21] Appl. No.: 618,424

[52] U.S. Cl. ............................. 193/31 R; 193/32; 221/15
[51] Int. Cl.² ........................................ B65G 11/20
[58] Field of Search ................ 193/31 R, 31 A, 32, 193/40; 221/15; 198/26, 41

[56] References Cited
UNITED STATES PATENTS

| | | | |
|---|---|---|---|
| 1,981,783 | 11/1934 | De Bussey | 186/1 B |
| 2,415,376 | 2/1947 | Strickland | 193/32 |
| 2,579,925 | 12/1951 | Jackson | 193/40 |
| 2,743,001 | 4/1956 | Nordquist | 198/41 |
| 2,838,160 | 6/1958 | Rouse | 198/41 |
| 2,974,775 | 3/1961 | Stacey et al. | 198/41 |
| 3,098,551 | 7/1963 | Dudley | 193/31 R |
| 3,167,168 | 1/1965 | Park | 198/41 |
| 3,294,210 | 12/1966 | Aiken et al. | 193/31 R |
| 3,344,378 | 9/1967 | Wilhelmson | 335/272 |
| 3,732,357 | 5/1973 | Rushing et al. | 358/42 |

Primary Examiner—Evon C. Blunk
Assistant Examiner—Jeffrey V. Nase
Attorney, Agent, or Firm—Robert P. Auber; Paul R. Audet; Ira S. Dorman

[57] ABSTRACT

Flow control apparatus and method for controlling the flow of gravity fed substantially cylindrical objects through a gravity runway wherein a starwheel, a star-shaped ferrous pulse rotor and a ferrous rotor are each spaced from each other and axially fixed to a free wheeling shaft mounted in a frame connected to a gravity runway such that the starwheel lobes jut into and rotate through the gravity runway. Each starwheel lobe engages each of a successive line of gravity cans as the cans fall through the runway. A magnetic sensor is mounted on the frame near the star-shaped pulse rotor such that as cans free fall past the starwheels and rotate the free wheeling shaft star points on the pulse rotor rotate past the sensor and disturb the sensor's emitted magnetic field. For each disturbance, the sensor emits an electrical pulse signal. Each pulse signal is transmitted to stator coils which extend radially inward on a fixed stator housing concentrically surrounding the rotor such that each pulse signal is capable of magnetically attracting a rotor pole to a stator pole thereby retard rotation of the rotor for the duration of the pulse signal. If the voltage amplitude of the pulse signal exceeds a pre-set threshold voltage a signal of controlled duration is transmitted to energize all of the coils and stator poles to momentarily attract the rotor poles and retard the can flow through the runway.

7 Claims, 4 Drawing Figures

FLOW CONTROL APPARATUS AND METHOD

BACKGROUND OF THE INVENTION

This invention relates to apparatus for controlling the flow of a stream of serially fed articles. More particularly, this invention relates to an apparatus for controlling the flow of gravity fed substantially cylindrical articles such as can bodies, such that the controlled flow output from the apparatus can be provided in any desired line or flow, or any series, or pattern of distribution. For example, the flow output can be divided and continuously fed to each of a plurality of output paths.

In industries which require the handling and conveying of large quantities of articles, such as in the can making industry, apparatus for controlling the flow of substantially cylindrical objects such as can bodies and for dividing the controlled flow into each of a plurality of output paths, are well known. However, such presently known object or can flow control and dividing apparatus have several disadvantages.

Some of the objectives of this invention are to overcome these and other disadvantages by providing a flow control apparatus which when compared to prior art can flow control apparatus, is smaller, occupies less space, is less costly to manufacture and operate, is more reliable, has a higher operating speed and provides more precise and instantaneous control and regulation of each, a plurality of, or all cans of the input flow line. The can output flow line from the flow control apparatus can be precisely and accurately tailored to meet the particular capabilities and requirements of each of a plurality of output paths. Any selected can, or number or series or pattern of cans may be fed to any output path in any sequence, timing or speed desired. Each can may be individually stopped or delayed, sped up or retarded for any length of time, as desired. All of this is done with minimal can damage. The flow control apparatus is uniquely capable of controlling can flow such that for the first time, a controlled continuous flow of containers is rapidly interruptable and divertable from a normal, vertically-downward path to a central output line below it, to an output line at either side of the central output line, such that can flow is capable of by-passing the central output line.

BRIEF SUMMARY OF THE INVENTION

The flow control apparatus of this invention basically comprises a starwheel, a star-shaped ferrous pulse rotor, and a ferrous rotor, each spaced from each other and axially fixed to a free-wheeling shaft such that the star-points of the pulse rotor and the poles of the rotor preferably are angularly displaced by a small predetermined angle. The starwheel lobes jut into and rotate through the gravity runway path such that each lobe rotatingly engages the underside of each of a successive line of cans as the cans fall through the runway path. A magnetic sensor is mounted near the star-shaped pulse rotor such that each time a pulse rotor star point rotates past the sensor, it disturbs the sensor's magnetic field and causes the magnetic sensor to emit an electrical pulse signal. A fixed stator housing having radially-inwardly extending coiled stator poles, concentrically surrounds the power rotor such that its rotor poles are rotatable past an equal number of stator poles. Electronic means connected to the magnetic sensor and to the stator housing transmit each magnetic sensor-emitted electrical pulse signal to the stator coils, each signals of which thereby simultaneously energizes all of the coils and the stator poles for the duration of a timed pulse, and for the pulse duration, the energized stator poles momentarily attract the rotor poles thereto. Electronic means are connected to the magnetic sensor for controlling the duration of the pulse sent to the stator housing and for thereby controlling the duration that the stator coils and poles are energized, the duration that the rotor poles are attracted to the stator poles and consequently delayed thereat, and, the duration that each can is engaged by each starwheel lobe.

The flow control apparatus is especially suitable for feeding ferrous cans to, and preferably includes, a magnetic can divider which includes electromagnetic rails connected to the discharge end of the gravity runway and defining a depending neck formed by outwardly and opposingly-angled left and right electromagnetic rails, the neck having a throat cavity divided by two vertically disposed central rails horizontally spaced from each other and from the neck electromagnetic rails, the central rails defining therebetween a central can output path and each cooperating with an adjacent neck electromagnetic rail to respectively define therebetween left and right side can output paths. Each of the electromagnetic rails include a top and a bottom elongated magnetic member and connected transaxially therebetween, iron poles with coils wrapped therearound for rendering the top and bottom members electromagnets. Energizing means are connected to the coils for energizing and de-energizing the coils and poles of either the left or right neck rails for diverting can flow from one of the output paths to another. Scanning means are connected to the neck and central rails for scanning and detecting the can quantities, statuses and needs of the respective left, central, and right output paths, and for appropriately controlling energization and deenergization of the coils of the respective left and right electromagnetic rails. Responsive means connected to the scanning means for responding to the signals of the scanning means and connected to the stator housing coil energizing means for appropriately controlling the energizing and/or de-energizing of the stator housing coils and thereby controlling the number, timing and rate of can output flow through the discharge and of the gravity runway. The responsive means are also connected to the respective first and second electromagnetic rails for appropriately controlling the energization and/or de-energization of the rail coils.

The method of controlling the flow of gravity fed substantially cylindrical objects through a gravity runway, basically comprises: allowing substantially cylindrical objects to gravity flow downward through a gravity runway, sensing the rate of flow of the gravity fed objects past a point in the runway, generating an electrical pulse signal whose voltage amplitude is directly related to the sensed rate of object flow, controlling the rate of object flow by establishing an adjustable external control voltage amplitude, employing the established control voltage amplitude as a reference voltage amplitude, comparing the voltage amplitude generated by the electrical pulse signal with the reference voltage amplitude, generating an electrical output signal when the voltage amplitude of the generated electrical pulse signal exceeds the voltage amplitude of the reference voltage, employing the electrical output signal to trigger an adjustable electronic timer whose timed "on" duration is externally adjustable, adjusting the timed "on" duration of the timer to a desired timed duration of a certain length, the timed "on" duration being a first logic timed "on" state, and the "off" duration being the second logic "off" state, utilizing the first logic timed "on" state to energize electromagnetic coils to thereby produce an electromagnetic force for the desired time duration of the first timed "on" logic state, and utilizing the electromagnetic force to control object flow retarding or advancing the object flow for the timed duration.

When the apparatus of this invention includes the magnetic can divider, the method includes the steps of: making the first logic timed "on" state available for energizing electromagnetic coils to thereby produce an electromagnetic force for the desired time duration of the first timed "on" logic state, providing a plurality of object output flow paths to which the controlled output flow can be directed, based on the status and needs of the respective output flow paths, generating a path-identifying logic state at each respective output path when and for as long as the status and needs of the output path are such that the objects are to be directed to flow thereto and therethrough, scanning the output flow path for, and detecting and selecting the generated path-identifying logic state of the path to which object flow is to be directed, making the path-identifying logic state of a certain duration available to de-energize electromagnetic coils to thereby produce an electromagnetic force for the certain duration of the path identifying logic state, giving the path-identifying logic state of a certain duration priority over the first logic timed "on" logic state when the former's certain duration is longer than the latter's timed "on" duration, and allowing and utilizing the path-identifying logic state to energize the electromagnetic coils to thereby produce an electromagnetic force to control object flow by retarding or advancing the object flow for the certain time duration of the path-identifying logic state.

Numerous other objects and advantages of the invention will be apparent as it is better understood from the following description, which, taken in connection with the accompanying drawing, discloses a preferred embodiment thereof.

DETAILED DESCRIPTION OF THE INVENTION

Figure 1:
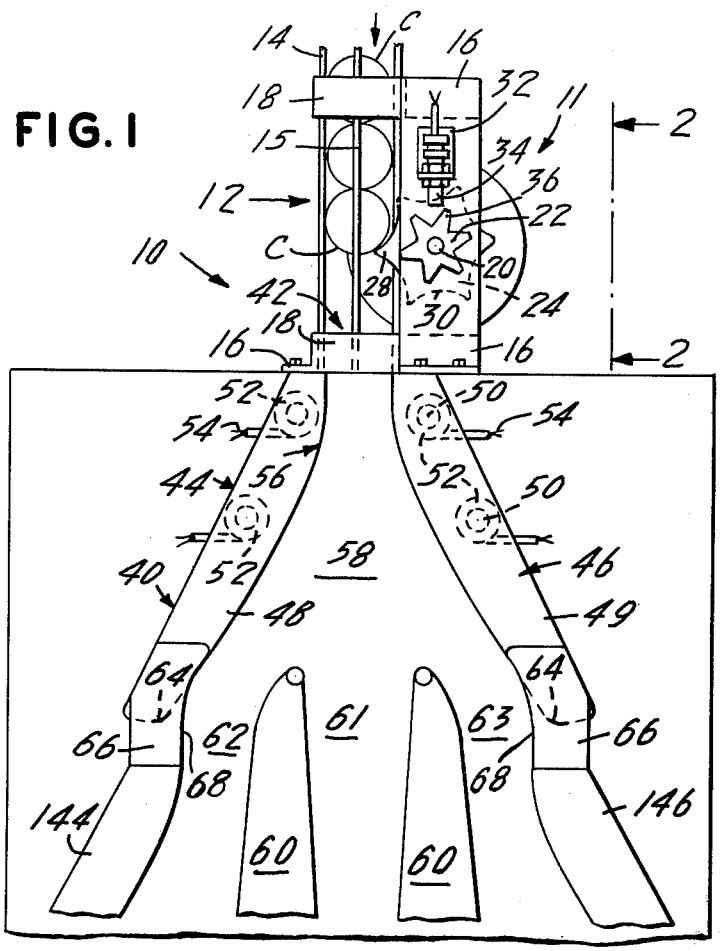
FIG. 1 is a front elevation with portions broken away showing the flow control apparatus of this invention.
Figure 2:
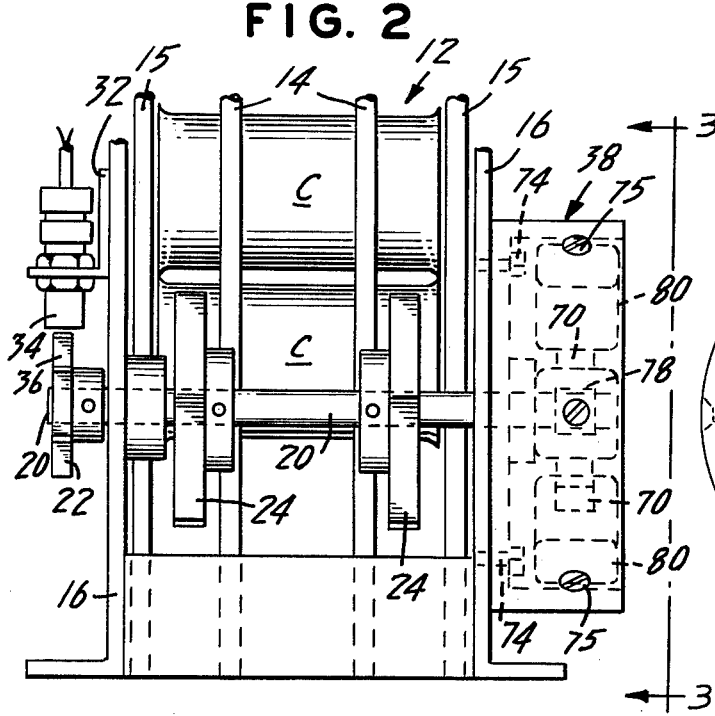
FIG. 2 is a side view of a portion of the flow control apparatus taken along line 2—2 of FIG. 1.
Figure 3:
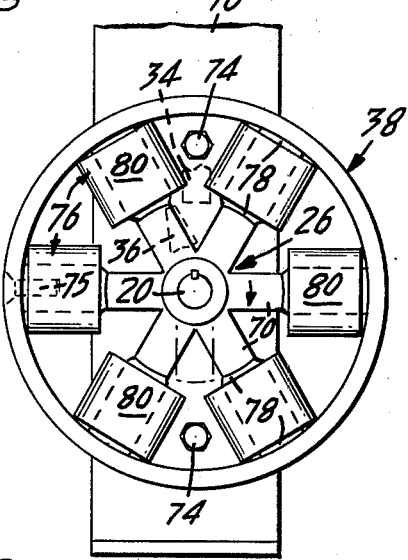
FIG. 3 is a side view taken along line 3—3 of FIG. 2.

Referring to the drawings in detail, FIG. 1 shows a preferred embodiment of the flow control apparatus of this invention. More particularly, FIG. 1 shows a flow control apparatus, generally designated 10, for controlling the flow of gravity fed substantially cylindrical objects such as can bodies C through, and the output flow from, a gravity runway generally designated 12. Cans C are preferably made of ferrous material, and are fed from any suitable source of supply through gravity runway 12, preferably conventionally formed of two pairs of guide rails 14, 15, which are attached to frame 16. Rails 14, 15 confine the sides and ends of the cans C to maintain or guide them in a predetermined path of travel. Flow control apparatus 10 is comprised of an assembly 11 which includes a frame 16 mountable on a gravity runway 12 by upper and lower brackets 18, a free-wheeling shaft 20 horizontally mounted in the frame and, axially and fixedly mounted on shaft 20, a star-shaped ferrous pulse rotor 22, a star-wheel 24, and a ferrous rotor 26 (FIGS. 2 and 3). FIG. 1 shows that flow control apparatus 10 includes engaging means, here in the form of starwheel lobes 28 and adjacent peripheral cutouts 30 (dashed line) which communicate with gravity runway 12 by rotatingly passing through the runway path during rotation of the starwheel, each lobe being for successively engaging and releasing the lowermost can of the succession of gravity fed free-falling cans that flow through the gravity runway. Flow control apparatus 10 includes sensing means, here shown as star-shaped pulse rotor 22 mounted on frame 16 by suitable means such as L-shaped bracket 32, magnetic sensor 34 aligned with and mounted over pulse rotor 22 such that, as the pulse rotor rotates counterclockwise, each of its star points 36 rotate past or under magnetic sensor 34. Flow control apparatus 10 also includes a stator housing 38 mounted on the far side of frame 16.

FIG. 1 also shows that when the apparatus is controlling the flow of ferrous cans C, preferably the flow control apparatus also includes a magnetic can divider generally designated 40 shown connected to gravity runway discharge end 42 by bolts attached to lugs on frame 16 for magnetically dividing a controlled output flow of cans as they are successively discharged from discharge end 42. Magnetic can divider 40 includes two outwardly and angularly extending opposed first and second electromagnetic rails 44, 46 each formed by top and bottom elongated ferrous members 48 interconnected transaxially by rail poles 50 having suitable wire coils 52 therearound, the coils being connected by wires 54 for energizing the coils and to thereby cause top and bottom elongated members 48, 49 to become electromagnets. As stated the upper ends of electromagnetic rails 44, 46 are connected at their upper ends to lugs extending from frame 16 at runway discharge end 42 such that the electromagnetic rails form a neck 56 which includes, between the rails, a throat cavity 58 which communicates with and forms a continuous pathway with the pathway within gravity runway 12. Throat cavity 58 includes and is divided by two vertically-disposed central rails 60 horizontally spaced from each other and from electromagnetic rails 44, 46. The interior longitudinal edges of central rails 60 define therebetween a central output path 61 and, their outer edges cooperate with the respective adjacent electromagnetic rails 44, 46 to respectively define therebetween left, center and right side output paths respectfully designated 62, 61 and 63.

The bottom ends of the inner edges of electromagnetic rails 44, 46 are tapered at 64 (dashed line) and have superimposed thereover, top and bottom stripper plates 66 (bottom one not shown) made of a non-magnetic material and having a relatively opposite taper at 68. Rail tapers 64 distribute and spread the magnetic lines of flux at the end of electromagnetic guide rails 44, 46 out over a rounded area rather than concentrating them at a corner. Rail tapers 64 and oppositely tapered edge 68 cooperate to gradually strip can C from electromagnetic rails 44, 46 as the can flows downwardly through its controlled path. The lower ends of stripper plates 66 are suitably superimposed over electromagnetic guide rails 144, 146, which are similar to guide rails 44, 46. Although not fully shown, outer guide rails 144, 146 can be electromagnetic rails for further dividing each respective left and right side output paths 62, 63, into two subpaths.

Flow control apparatus 10 and magnetic can divider 40 operate as follows. Substantially cylindrical objects are allowed to gravity flow and free-fall downward through gravity runway 12 and through neck 56 vertically downward through central path 61. If the feeding of cans to central path 61 is to be terminated, stator coils 80 (FIG. 3) are energized to interrupt can flow, and then guide rail coils 52 are energized by suitable means (discussed later) to make elongated members 49 electromagnets. Coils 80 (FIG. 3) are then de-energized to allow cans to commence to flow mostly along and on the inner edge of electromagnetic rail 46 and into right side output path 63. When can flow is to be diverted from the right output path 63 back to central output path 61, stator coils 80 are momentarily energized to interrupt can flow and then coils 52 are de-energized and the free-falling cans again flow directly downward into central output path 61. If can flow is to be directed from right side output path 63 to left side output path 62, stator coils 80 are momentarily energized to interrupt can flow while coils 52 on rail 46 are de-energized and those for electromagnetic rail 44 are energized to attract cans against the inner edge of electromagnetic rails 44 such that they fall into left side output path 62.

FIG. 2 is an enlarged side view with portions broken away taken along line 2—2 of FIG. 1. More particularly, FIG. 2 shows frame 16 mounted, by suitable means (not shown), onto gravity runway 12 whose side and end guide rails 14, 15 confine horizontally disposed cans C. FIG. 2 shows the structural arrangement of the flow control apparatus of this invention wherein shaft 20 is free-wheelingly mounted in frame 16. Axially and fixedly mounted on shaft 20 are star-shaped pulse rotor 22, starwheels 24 and rotor 26 (dashed line) having radially outwardly extending rotor poles 70 (see FIG. 3). Rotor 26 rotates concentrically within the electromagnetic stator housing 38 fixed by suitable means such as bolts 74 to frame 16. Also mounted on the frame 16 by means of an L-shaped bracket 32 and nuts 33, is magnetic sensor 34 which is vertically aligned with star-shaped pusle rotor 22 such that the pulse rotor rotates under and its star points rotatingly pass directly under the magnetic sensor.

FIG. 3 is a side view with portions broken away taken along line 3—3 of FIG. 2. More particularly, FIG. 3 shows rotor 26 affixed to free-wheeling shaft 20 and having radially outwardly extending rotor poles 70. FIG. 3 shows that electromagnetic stator housing 38 has affixed thereto by suitable means such as screws 75 (one shown), a plurality of radially-inwardly extending stator assemblies 76, each including stator poles 78 having coils 80 therearound, the stator assemblies 76 being equal in number with rotor poles 70. Stator housing 38 is mounted on frame 16 such that it is in substantial radial alignment with and concentrically encompasses rotor 26 in a manner that rotor poles 70 rotate past stator assemblies 76 with an air gap (not shown) therebetween. An examination of FIGS. 1 and 3 show that starwheel 24, pulse rotor 22, and rotor 26 are each fixed to free-wheeling shaft 20 in a manner that their respective lobes 28, star points 36 and rotor poles 70, by their being fixed to shaft 20, are in sychronized radial disposition relative to each other. This disposition can be at any relative angle with respect to each other, although when the magnetic sensor is in a fixed position and each can is to be retarded by the starwheels, pulse rotor 22 must be fixed to shaft 20 such that its star points pass under magnetic sensor 34 just after rotor poles 70 are aligned with stator poles 78. This allows a pulse signal from magnetic sensor 34 to serially momentarily retard the rotor poles at or adjacent the stator poles and momentarily serially retard each can at the starwheel. Similarly, when flow of each individual can is to be individually stepped up, each star point must pass under the magnetic sensor just before rotor poles 70 and stator poles 78 are substantially aligned. Thus, as shown in FIGS. 1 and 3, when rotor poles 70 are aligned with stator poles 78, a starwheel lobe engages a can C (FIG. 1).

Figure 4:
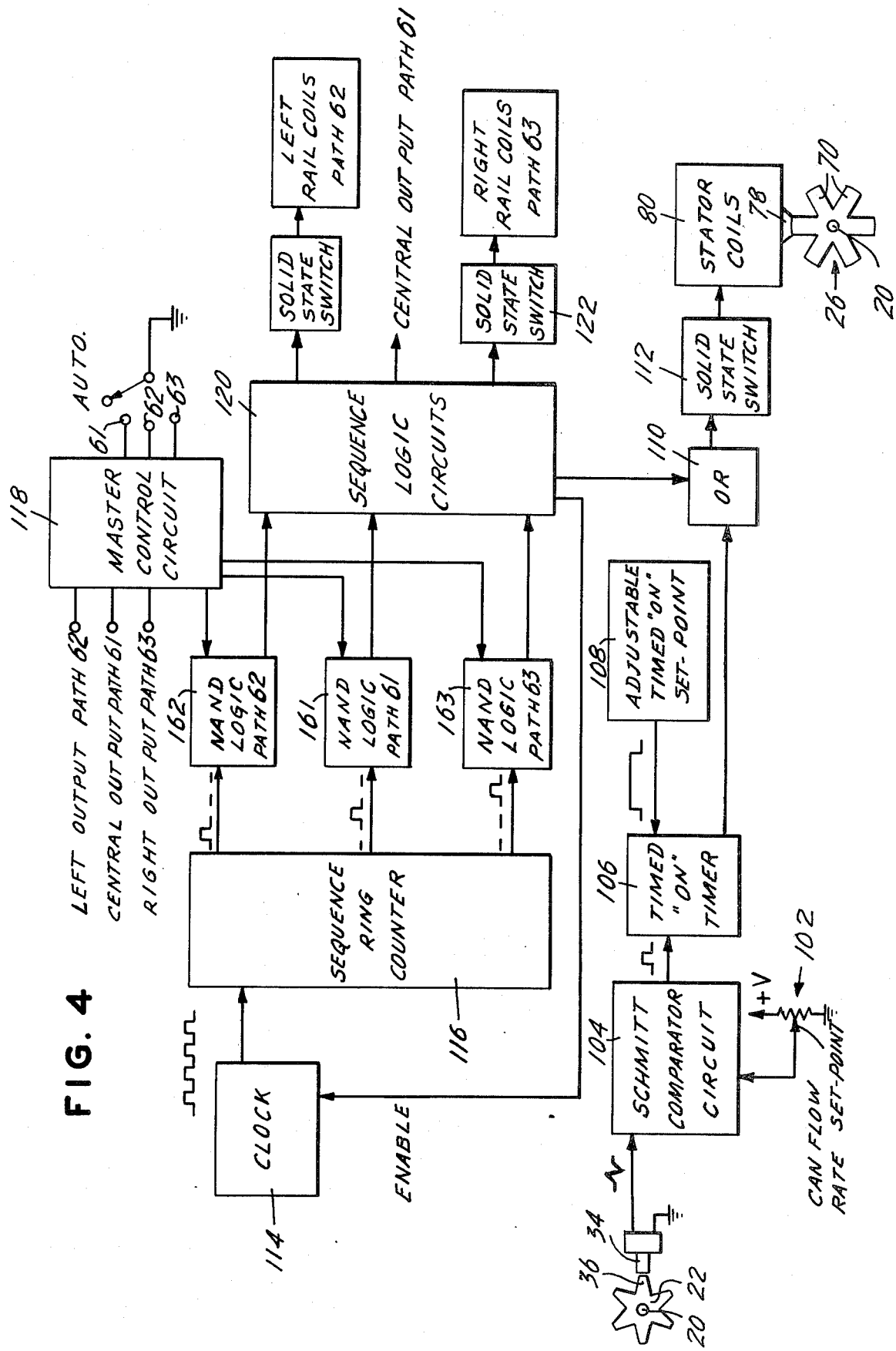
FIG. 4 is a block diagram representing electronic circuitry employed for operating the flow control apparatus of this invention.

FIG. 4 is a block diagram of the electronic circuitry employed for the flow control apparatus of this invention. FIG. 4 can be understood by considering an example of the operation of the flow control apparatus of this invention. As gravity fed free-falling cans C are allowed to flow downward through the path defined by gravity runway 12, each successive lowermost can C is engaged by a respective starwheel lobe 28 and by starwheel cutout 30, which starwheel rotates freely on free-wheeling shaft 20. Since cans C are free-falling, they are falling at an increasing rate of speed past starwheels 24 and thereby cause the starwheels to rotate at an increasing rate of speed. Since starwheels 24 and star-shaped pulse rotor 22 are fixed to free-wheeling shaft 20, the increasing rate of free-falling can flow not only increases the rotational speed of starwheels 24 but also that of pulse rotor 22. Magnetic sensor 34 senses the rate of flow of the gravity fed cans past starwheels 24. As each pulse rotor star point 36 passes magnetic sensor 34, which produces a magnetic field, the passing star point disturbs the magnetic field, the sensor senses the disturbance in the field and generates an electrical pulse signal of a certain voltage amplitude which signifies the rate of change in the magnetic field and therefore is directly related to the rotational speed of the pulse rotor star points, and to the sensed rate of can flow past starwheel 24. Thus, the pulse signal voltage amplitude increases as the star point's rotational speed increases. The rate of flow of the free-falling cans, and therefore the rotational speed of pulse rotor 22, eventually reach a preselected threshold speed, which for purposes of this explanation is considered too fast for say output path can quantity status. As shown in FIG. 4, the preselected threshold speed is established by suitable means for establishing an adjustable external control voltage amplitude, such as variable resistor 102. The variable resistor is connected to suitable means such as Schmitt comparator 104, for employing the established controlled voltage amplitude as a reference voltage amplitude which thereby establishes a trigger set point for the preselected specific can flow rate, i.e. the pulse rotor star point threshold rotational speed. The electrical pulse signal whose voltage amplitude is directly related to the sense rate of object flow and which emanates from magnetic sensor 34 is applied to the Schmitt comparator circuit 104 which compares the voltage amplitude generated by the electrical pulse signal with the reference voltage amplitude, and generates an electrical output signal when the voltage amplitude of the generated electrical pulse signal exceeds that of the reference voltage which is sent to suitable means such as an adjustable electronic timed "on" timer 106 whose timed "on" duration is externally adjustable. Suitable means such as represented by block 108 are provided for adjusting the timed "on" duration of timer 106 to a desired time duration of a certain length, the timed "on" duration being a first logic timed "on" state and the "off" duration being a second logic "off" state. The first logic timed "on" state is utilized and applied to suitable means, such as by actuating an "OR" circuit 110 and such as a solid state power switch 112 to simulatneously energize all of the electromagnetic stator coils 80 for the controlled pulse duration which is the desired time duration of the first timed "on" logic state. The electromagnetic force applied to stator coil assembly 76 creates a magnetic attraction between each rotor pole 70 and each adjacent stator pole 78 which, for the duration of the extended pulse or first timed "on" logic state, retards rotation of rotor poles 70 at stator poles 78. Again, due to their being fixed to free-wheeling shaft 20, controlled extended pulse retardation of rotor poles 70 and rotor 76 likewise pulsedly retards rotation of starwheel 28 and passage of cans C there past for the controlled pulse duration. The extent of the pulse duration is preselectedly set for example by an operator, by adjusting the adjustable timed "on" set point circuit 108. Thus, the can output flow from gravity runway 12 can be precisely and accurately controlled such that any selected can, or number or series or patterns of cans may be delayed or retarded (or sped up) for any preselected adjusted time duration such that can output flow can be in any sequence, timing or speed desired. Each can may be individually stopped or delayed or sped up for any length of time desired.

At the end of the timed duration, stator coils 80 are de-energized to thereby terminate the magnetic attraction between stator poles 78 and rotor 70. Since rotor poles 70 are no longer magnetically attracted to stator poles 78, rotor 26 is free to rotate and thereby frees shaft 20 to which it is fixed, to free-wheelingly rotate. The freeing of rotor 26 and shaft 20 thereby frees starwheels 24 and cans start gravity flowing past and thereby cause starwheels 24 to rotate. This again, causes pulse rotor star points 36 to rotate at an increasing rate of speed past magnetic sensor 34. A particularly advantageous feature of the flow control apparatus of this invention is that by varying the power applied to the coils, a variable electromatic springlike or cushioning force is produced during the magnetic attraction of and retardation of rotary poles 70, which greatly softens the engagement of starwheel lobes with cans C and thereby greatly reduces can damages such as dents and crushings which commonly occur with prior art mechanical types of flow curtailing gates. By virtue of the cotrolled time duration feature which allows extended, curtailed, nonexistent or continual pulse duration, as desired, provides an ability to tailor an object output flow from a gravity runway to flow to downstream output paths according to their respective can quantity and capability status, and requirements because any selected can or number of cans may be fed to any output line in any sequence, timing or speed desired. Flow control apparatus 10 is particularly suitable for feeding cans to magnetic can dividers particularly to a novel three-way divider having a central path directly beneath the gravity runway output path, and side paths to either side of the central path, because the apparatus permits a rapid retardation of can flow which allows cans to be rapidly shifted all the way from a left side path over the central path to a right side path. The operation of the flow control apparatus with magnetic can divider 40 can be explained in relation to FIG. 4. Magnetic can divider 40 includes scanning means connected thereto and communicating with throat cavity 58 and respective left side, central and right side output paths 62, 61 and 63 for scanning and detecting their respective can quantity status, capabilities and needs. The scanning means scans the output flow path from discharge end 42 of gravity runway 12, detects and selects the particular path to which the object output flow is to be directed. Magnetic can divider 40 also includes responsive means connected to the scanning means for responding to the can status and needs of the respective output paths. The responsive means also being connected to the stator housing coil energizing means for appropriately controlling the energizing and-/or de-energizing of the stator coils and thereby controlling the number, timing and rate of can output flow through the discharge end of the gravity runway. The responsive means is also connected to the respective first and second electromagnetic rails 44, 46 for appropriately controlling the energization and de-energization of the rail coils 52 in synchronism with the output flow. By way of example, assuming output path 62, 61 and 63 do not need cans, the scanning means are in operation, and clock 114 which is a square wave generator sends a square wave pattern of sequential high logic and low logic states to step an output path sequence ring counter 116 which, with the NAND logic circuits designated 162, 161 and 163 scan and search the respective output flow paths for a signal indicating that one or more of the paths needs cans. More particularly, ring counter 116 sends a square wave in timed sequence first to NAND logic circuit 162 for left output path 62, then to 161 for central output path 61, then to 163 for right output path 63. This sequence is repeated over and over until one of the square waves in one of the respective NAND logic circuits meets a path output signal, more particularly, an output flow path generated path-identifying logic state which logic state indicates that the particular path needs cans. Assuming suitable sensors (not shown) in central output path 61 sense that path 61 needs cans, the sensor generates a path-identifying logic state to an interlocked master control circuit 118 which when its master control selector switch is, as shown, on the automatic mode, sends the generated path identifying logic state for central output path 61 to NAND logic circuit 161 which, when it meets the square wave from ring counter 116, sends the path identifying logic state to control an output path sequence logic circuits generally designated 120. When the path identifying logic state reaches logic circuits 120, clock 114 is stopped and the path identifying logic state of a certain duration is made available to "OR" circuit 110 which, through solid state switch 112 de-energizes stator coils 80 and renders rotor 26 and therefore starwheels 24 free wheeling. Cans start flowing past the starwheels at an increasing rate of speed until the rotational speed of pulse rotor star points 36 pass magnetic sensor 34 reaches the threshold speed. As previously explained, this triggers the timed "on" timer which, for the duration of the first logic timed "on" state through the energization of stator coils 80 attracts rotor poles 70 to stator poles 78 and controls the rate of flow of cans vertically downward to and through central output path 61. When that path no longer needs cans, its sensor (not shown) generates a path-identifying logic state which through master control circuit 118, NAND logic circuit 161 and logic circuits 120 locks OR circuit 110 for a definite duration due to the fact that OR circuit 110 allows the path-identifying logic state of indefinite duration priority over first logic timed "on" logic state from timer 106 due to the former's longer logic state duration. OR circuit 110 therefore energizes stator coils 80 and magnetically attracts rotor poles 70 thereto to stop can flow past starwheel 24, for the indefinite duration. Once the path-identifying logic state reaches logic circuits 120 indicating that central output path 61 no longer needs cans, logic circuits 120 turns clock 114 on which in turn initiates the scanning search mode wherein ring counter 116 checks each NAND logic circuit 162, 161 and 163 until one of them indicates that its output path requires cans. Assuming the sensor for right side output path 63 generates a signal which indicates that path needs cans, a path-identifying logic state is again past through master control circuit 118 to NAND logic circuit 163 which then activates logic control circuits 120 which in turn allows and utilizes the path identifying logic state and through a solid state power switch 122 energizes right side magnetic rail coils 52. Then OR circuit 110 gives the path-identifying logic state priority over the shorter duration first logic timed "on" logic state and, as explained, de-energizes stator coils 80 to free rotor 26 to rotate freely. Cans therefore free-fallingly flow through gravity runway discharge end 42, neck 56 and are attracted to and move along right electromagnetic guide rail 46 and down into right side output path 63 until its sensor indicates that the path is full and cans are no longer needed. When this occurs, the path-identifying logic state past to OR circuit 110 is terminated and the circuit energizes stator coils 80 and thereby stops can flow for an indefinite duration. Right side magnetic rail coils 52 or gate 63 remain energized for a short time to assure that all trailing cans pass into pass 63. Assuming clock 114 and the search system immediately indicates that left output path 62 needs cans, the generated path-identifying logic state for that path through logic circuits 120 immediately energizes left magnetic rail coils 52 or path 62 and through OR circuit 110 immediately energizes stator coils 80 such that can flow is only nearly instantaneously interrupted while can flow is controlledly directed from right side output path 63 over central output path 61 to and through left side output path 62. When that path is filled and the scanning means indicates that another requires cans, the clock is stopped by the sequenced logic circuit, the proper output path is elected and the stator coils are again de-energized and allow starwheels 24 to rotate freely. During this free rotation period, the can deaccelerator is active, rotor poles 70 are pulsedly retarded at a certain can per minute flow rate through the divider system. The aforementioned can flow control cycle is continually repeated. Thus, by adjusting the timed "on" set point 108, one can select a desired rate of can flow because the extent of pulse duration determines how long each can will be delayed or stepped up at starwheels 24. By changing the angular relationship of pulse rotor 22 with respect to rotor 26 one can also effect the rate of can flow, Further, by energizing or de-energizing stator coils 80, one can impart total "off" or total "on" can flow conditions.

It is thought that the invention and many of its attendant advantages will be understood from the foregoing description and it will be apparent that various changes may be made in the form, construction and arrangement of parts of the apparatus mentioned herein and in the steps and order of accomplishment of the method described herein, without departing from the spirit and scope of the invention or sacrificing all of its material advantages, the apparatus and method hereinbefore described being merely a preferred embodiment thereof.

I claim:

1. A flow control apparatus for controlling the flow of gravity fed substantially cylindrical objects through the path of a gravity runway, which comprises:
    an assembly mountable onto the gravity runway; the assembly including
    engaging means communicating with the gravity runway path for successively engaging and releasing each respective gravity fed substantially cylindrical object that necessively flows through the gravity runway,
    sensing means for sensing each engagement of the engaging means with each of the objects,
    signal generating means cooperative with the sensing means for generating an electrical pulse signal whose amplitude signifies the duration of each engagement of the engaging means with an object,
    means connected to the signal generating means for pre-setting a threshold pulse signal amplitude level, for detecting the amplitude level of the generated pulse signal and the threshold level, and for comparing them and thereby controlling the duration of the pulse signal when the generated level exceeds the threshold level, and
    means connected to the threshold setting and controlling means, and to the engaging means, for utilizing the controlled pulse signal for controlling the duration of the engaging means,
    sending means connected to the threshold setting and controlling means, and to the utilizing means, for sending the controlled pulse signal to the engaging means for controlling the duration of the engaging of the engaging means, each of said means operating in synchronism for preselectedly controlling the flow of gravity fed objects through, and the output flow of objects from, the gravity runway.

2. A flow control apparatus for controlling the flow of gravity fed substantially cylindrical objects through and the output flow from, the discharge path of a gravity runway, which comprises:
    an assembly mountable on the gravity runway, the assembly including
    a frame adapted to be mounted on the gravity runway,
    a free-wheeling shaft mounted horizontally in the frame; and, axially and fixedly mounted on the shaft,
    a starwheel having lobes and adjacent peripheral cutouts, positioned on the shaft to rotatingly pass through the graivty runway path during rotation of the shaft, the lobes and cutouts being for successively rotatingly engaging and releasing the lowermost of a succession of gravity fed objects that flow through the gravity runway,
    a pulse rotor having radially outwardly extending points, and a rotor having radially outwardly extending poles, the starwheel, pulse rotor and rotor being fixed to the shaft such that their respective lobes, points and poles are in synchronized radial disposition relative to each other; and, also mounted on the frame, an electromagnetic stator housing having affixed thereto, a plurality of radially inwardly-extending stators each including stator poles with coils therearound, the stator poles being equal in number with the rotor poles, and the stator housing being in radial alignment with and concentrically encompassing the rotor in a manner that the rotor poles rotate past the stators with an air gap therebetween, and, a magnetic sensor which senses disturbances in a magnetic field, the sensor being aligned with the pulse rotor such that as the pulse rotor rotates, each point passes by the magnetic sensor, disturbs the magnetic field and causes the sensor to generate a pulse signal whose voltage amplitude signifies the rate of change in the magnetic field and the rotational speed of the pulse rotor; and, control means connected to the magnetic sensor for pre-selectedly determining, setting and controlling the duration of each pulse signal generated by the magnetic sensor, the control means including means connected to the stator coils and to the control means for sending the controlled pulse signals to and simultaneously energizing or deenergizing all stator coils for the controlled pulse duration, to thereby pre-selectedly control the duration of energized attraction between the stator poles and rotor poles, to thereby control the rotational speeds of the rotor, the shaft, and the starwheel affixed thereto, and thereby control the flow of gravity fed objects past the starwheel and the flow of the objects through and the output flow from, the path of the gravity runway.

3. The flow control apparatus of claim 2 wherein the objects are ferrous can bodies, the frame is mounted on the gravity runway, wherein the gravity runway has a discharge end downstream of the frame, and wherein there is included:

a magnetic can divider connected to the discharge end for receiving from the discharge path and for magnetically dividing a controlled output flow of objects as they are succesively discharged from the discharge end, the magnetic can divider including:

two outwardly and angularly-extending, opposed, first and second electromagnetic rails, each formed by ferrous top and bottom elongated members interconnected transaxially by iron poles having coils therearound for energizing the coils and magnetizing the top and bottom elongated members, the electromagnetic rails having their upper ends connected to and communicating with the frame discharge end to form a neck having a throat cavity which forms a continuous path with that of the gravity runway, the throat cavity including and being divided by two vertically-disposed central rails horizontally spaced from each other and from the electromagnetic rails, the central rails defining therebetween a central output path, and each cooperating with its adjacent electromagnetic rail to respectively define therebetween first and second side output paths, energizing means connected to the coils for energizing and deenergizing the coils of either the first or second electromagnetic rails to divert can flow from one output path to another, scanning means communicating with the throat cavity and the respective pathways for scanning and detecting the can status and the needs of the respective output paths, responsive means connected to the scanning means for responding to the can status and needs of the respective output paths, connected to the stator housing coil energizing means for appropriately controlling the energizing and/or deenergizing of the stator housing coils and thereby controlling the number, timing and rate of can output flow through the discharge end of the gravity runway, and connected to the respective first and second electromagnetic rails for appropriately controlling the energization and/or deenergization of the rail coils in synchronism with the output flow.

4. A method of controlling the flow of gravity fed substantially cylindrical objects through a gravity runway, which comprises:

allowing substantially cylindrical objects to gravity flow downward through a gravity runway, sensing the rate of flow of the gravity fed objects past a point in the runway, generating an electrical pulse signal whose voltage amplitude is directly related to the sensed rate of object flow, controlling the rate of object flow by establishing an adjustable external control voltage amplitude, employing the established control voltage amplitude as a reference voltage amplitude, comparing the voltage amplitude generated by the electrical pulse signal with the reference voltage amplitude, generating an electrical output signal when the voltage amplitude of the generated electrical pulse signal exceeds the voltage amplitude of the reference voltage, employing the electrical output signal to trigger an adjustable electronic timer whose timed "on" duration is externally adjustable, adjusting the timed "on" duration of the timer to a desired timed duration of a certain length, the timed "on" duration being a first logic timed "on" state, and the "off" duration being the second logic "off" state, utilizing the first logic timed "on" state to energize electromagnetic coils to thereby produce an electromagnetic force for the desired time duration of the first timed "on" logic state, and utilizing the electromagnetic force to control object flow by retarding or advancing the object flow for the timed duration.

5. A method of controlling the flow of gravity-fed substantially cylindrical objects through a gravity runway, which comprises:

allowing substantially cylindrical objects to gravity flow downward through a gravity runway, sensing the rate of flow of the gravity fed objects past a point in the runway, generating an electrical pulse signal whose voltage amplitude is directly related to the sensed rate of object flow, controlling the rate of object flow by establishing an adjustable external control voltage amplitude, employing the established control voltage amplitude as a reference voltage amplitude, comparing the voltage amplitude generated by the electrical pulse signal with the reference voltage amplitude, generating an electrical output signal when the voltage amplitude of the generated electrical pulse signal exceeds the voltage amplitude of the reference voltage, employing the electrical output signal to trigger an adjustable electronic timer whose timed "on" duration is externally adjustable, adjusting the timed "on" duration of the timer to a desired timed duration of a certain length, the timed "on" duration being a first logic timed "on" state, and the "off" duration being the second logic "off" state, utilizing the first logic timed "on" state to energize electromagnetic coils to thereby produce an electromagnetic force for the desired time duration of the first timed "on" logic state, utilizing the electromagnetic force to control object flow by retarding or advancing the object flow for the timed duration, making the first logic timed "on" state available for energizing electromagnetic coils to thereby produce an electromagnetic force for the desired time duration of the first timed "on" logic state, providing a plurality of object output flow paths to which the controlled output flow can be directed, based on the status and needs of the respective output flow paths, generating a path-identifying logic state at each respective output path when and for as long as the status and needs of the output path are such that the objects are to be directed to flow thereto and therethrough, scanning the output flow path for, and detecting and selecting the generated path-identifying logic state of the path to which object flow is to be directed, making the path-identifying logic state of a certain duration available to energize electromagnetic coils to thereby produce an electromagnetic force for the certain duration of the path-identifying logic state, giving the path-identifying logic state of a certain duration priority over the first logic timed "on" logic state when the former's certain duration is longer than the latter's timed "on" duration, and allowing and utilizing the path-identifying logic state to energize the electromagnetic coils to thereby produce an electromagnetic force to control object flow by retarding or advancing the object flow for the certain time duration of the path-identifying logic state.

6. A flow control apparatus for controlling the flow of gravity-fed substantially cylindrical objects through the path of a gravity runway, which comprises:

means for controlling the rate of object flow including:

means for allowing substantially cylindrical objects to gravity flow downward through a gravity runway, means for sensing the rate of flow of the gravity fed objects past a point in the runway, means for generating an electrical pulse signal whose voltage amplitude is directly related to the sensed rate of object flow, means for establishing an adjustable external control voltage amplitude, means for employing the established control voltage amplitude as a reference voltage amplitude, means for comparing the voltage amplitude generated by the electrical pulse signal with the reference voltage amplitude, means for generating an electrical output signal when the voltage amplitude of the generated electrical pulse signal exceeds the voltage amplitude of the reference voltage, means for employing the electrical output signal to trigger an adjustable electronic timer whose timed "on" duration is externally adjustable, means for adjusting the timed "on" duration of the timer to a desired timed duration of a certain length, the timed "on" duration being a first logic timed "on" state, and the "off" duration being the second logic "off" state, means for utilizing the first logic timed "on" state to energize electromagnetic coils to thereby produce an electromagnetic force for the desired time duration of the first timed "on" logic state, and means for utilizing the electromagnetic force to control object flow by retarding or advancing the object flow for the timed duration.

7. A flow control apparatus for controlling the flow of gravity-fed substantially cylindrical objects through the path of a gravity runway, which comprises: means for controlling the rate of object flow including:

means for allowing substantially cylindrical objects to gravity flow downward through a gravity runway, means for sensing the rate of flow of the gravity fed objects past a point in the runway, means for generating an electrical pulse signal whose voltage amplitude is directly related to the sensed rate of object flow, means for establishing an adjustable external control voltage amplitude, means for employing the established control voltage amplitude as a reference voltage amplitude, means for comparing the voltage amplitude generated by the electrical pulse signal with the reference voltage amplitude, means for generating an electrical output signal when the voltage amplitude of the generated electrical pulse signal exceeds the voltage amplitude of the reference voltage, means for employing the electrical output signal to trigger an adjustable electronic timer whose timed "on" duration is externally adjustable, means for adjusting the timed "on" duration of the timer to a desired timed duration of a certain length, the timed "on" duration being a first logic timed "on" state, and the "off" duration being the second logic "off" state, means for utilizing the first logic timed "on" state to energize electromagnetic coils to thereby produce an electromagnetic force for the desired time duration of the first timed "on" logic state, means for utilizing the electromagnetic force to control object flow by retarding or advancing the object flow for the timed duration, means for making the first logic timed "on" state available for energizing electromagnetic coils to thereby produce an electromagnetic force for the desired time duration of the first timed "on" logic state, means for providing a plurality of object output flow paths to which the controlled output flow can be directed, based on the status and needs of the respective output flow paths, means for generating a path-identifying logic state at each respective output path when and for as long as the status and needs of the output path are such that the objects are to be directed to flow thereto and therethrough, means for scanning the output flow path for, and detecting and selecting the generated path-identifying logic state of the path to which object flow is to be directed, making the path-identifying logic state of a certain duration available to de-energize electromagnetic coils to thereby produce an electromagnetic force for the certain duration of the path-identifying logic state, means for giving the path-identifying logic state of a certain duration priority over the first logic timed "on" logic state when the former's certain duration is longer than the latter's timed "on" duration, and means for allowing and utilizing the path-identifying logic state to energize the electromagnetic coils to thereby produce an electromagnetic force to control object flow by retarding or advancing the object flow for the certain time duration of the path-identifying logic state.

* * * * *